(12) United States Patent
Grande et al.

(10) Patent No.: US 9,267,345 B2
(45) Date of Patent: Feb. 23, 2016

(54) FLOW ACTIVATED CIRCULATING VALVE

(75) Inventors: Eirik Grande, Stavanger (NO); Arild F. Stein, Sandnes (NO)

(73) Assignee: Interwell AS (NO)

( * ) Notice: Subject to any disclaimer, the term of this patent is extended or adjusted under 35 U.S.C. 154(b) by 145 days.

(21) Appl. No.: 14/342,238

(22) PCT Filed: Sep. 5, 2012

(86) PCT No.: PCT/EP2012/067275
§ 371 (c)(1),
(2), (4) Date: Jul. 29, 2014

(87) PCT Pub. No.: WO2013/034577
PCT Pub. Date: Mar. 14, 2013

(65) Prior Publication Data
US 2014/0345705 A1 Nov. 27, 2014

(30) Foreign Application Priority Data

Sep. 5, 2011 (NO) .................................. 20111202

(51) Int. Cl.
*F16K 17/04* (2006.01)
*E21B 21/10* (2006.01)
(Continued)

(52) U.S. Cl.
CPC ............... *E21B 21/10* (2013.01); *E21B 23/006* (2013.01); *E21B 34/10* (2013.01); *E21B 34/103* (2013.01);
(Continued)

(58) Field of Classification Search
CPC ....... E21B 21/10; E21B 34/10; E21B 34/103; E21B 23/006; E21B 2034/007; F16K 15/063; Y10T 137/1677; Y10T 137/7855
USPC .............. 137/68.17, 14, 515.3; 251/230, 343, 251/63.6; 166/374, 154; 175/268, 218, 305
See application file for complete search history.

(56) References Cited

U.S. PATENT DOCUMENTS 4,298,077 A    11/1981   Emery
4,403,659 A *   9/1983   Upchurch ............... E21B 34/10
                                               166/321
(Continued)

OTHER PUBLICATIONS

Search Report and Written Opinion of the International Searching Authority; PCT/EP2012/067275; Jul. 25, 2013.

*Primary Examiner* — Matthew W Jellett
*Assistant Examiner* — Minh Le
(74) *Attorney, Agent, or Firm* — Andrus Intellectual Property Law, LLP

(57) ABSTRACT

The invention relates to a flow activated circulating valve (1). The valve comprises an outer housing (10) comprising radial ports (11) provided axially between an upper portion (1a) of the valve (1) and a lower portion (1b) of the valve (1). An inner sleeve (20) provided inside the outer housing (10), where the inner sleeve (20) is providing an axial bore (21) through the upper portion (1a) of the valve (1) to the radial ports (11). A cylinder compartment (30) is provided between the inner sleeve (20) and the outer housing (10). A piston (40) is arranged for axial and rotational movement in the cylinder compartment (30), where the piston (40) comprises piston ports (41) arranged to provide fluid communication between the axial bore (21) and the radial ports (11) when the piston (40) is in an open position (P0), and where the piston (40) is arranged to prevent fluid communication between the axial bore (21) and the radial ports (11) when the piston (40) is in closed positions (P1, P2, P3). An actuating device (50) is applying an axial pressure on the piston (40). A sleeve opening (22) is providing fluid communication between the axial bore (21) and the cylinder compartment (30). A fluid orifice (24) provided radially inside the inner sleeve (20). A position controlling device (60) for controlling the axial and rotational position of the piston (40) in relation to the outer housing (10).

12 Claims, 5 Drawing Sheets

(51) Int. Cl.
*E21B 23/00* (2006.01)
*E21B 34/10* (2006.01)
*F16K 15/06* (2006.01)
*E21B 34/00* (2006.01)

(52) U.S. Cl.
CPC ......... *F16K 15/063* (2013.01); *E21B 2034/007* (2013.01); *Y10T 137/1677* (2015.04); *Y10T 137/7855* (2015.04)

(56) References Cited

U.S. PATENT DOCUMENTS

| | | | |
|---|---|---|---|
| 4,711,305 A | 12/1987 | Ringgenberg | |
| 4,749,044 A * | 6/1988 | Skipper | E21B 34/102 166/301 |
| 5,022,426 A * | 6/1991 | Fischer | F16K 31/36 137/119.03 |
| 5,609,178 A * | 3/1997 | Hennig | E21B 23/006 137/10 |
| 6,095,249 A * | 8/2000 | McGarian | E21B 21/002 166/319 |
| 6,109,354 A | 8/2000 | Ringgenberg et al. | |
| 6,293,342 B1 | 9/2001 | McGarian et al. | |
| 6,948,561 B2 * | 9/2005 | Myron | E21B 34/14 166/240 |
| 7,281,584 B2 * | 10/2007 | McGarian | E21B 23/006 166/169 |
| 7,527,104 B2 * | 5/2009 | Branch | E21B 21/10 137/508 |
| 7,584,801 B2 * | 9/2009 | deBoer | E21B 21/10 166/321 |
| 7,857,058 B2 * | 12/2010 | Tulloch | E21B 17/05 166/173 |
| 8,215,403 B1 * | 7/2012 | Penisson | E21B 21/103 166/321 |
| 8,607,811 B2 * | 12/2013 | Korkmaz | E21B 23/006 137/508 |
| 8,693,284 B2 * | 4/2014 | Allan | E21B 47/18 367/81 |
| 8,739,864 B2 * | 6/2014 | Crider | E21B 34/14 166/240 |
| 8,757,273 B2 * | 6/2014 | Themig | E21B 34/102 137/462 |
| 8,960,333 B2 * | 2/2015 | Radford | E21B 10/322 175/268 |
| 2003/0221837 A1 * | 12/2003 | Giroux | E21B 21/103 166/373 |
| 2005/0072575 A1 * | 4/2005 | Yeo | E21B 33/16 166/374 |
| 2009/0211814 A1 * | 8/2009 | de Boer | E21B 21/10 175/57 |
| 2011/0149692 A1 * | 6/2011 | Collette | G01V 11/002 367/143 |

\* cited by examiner

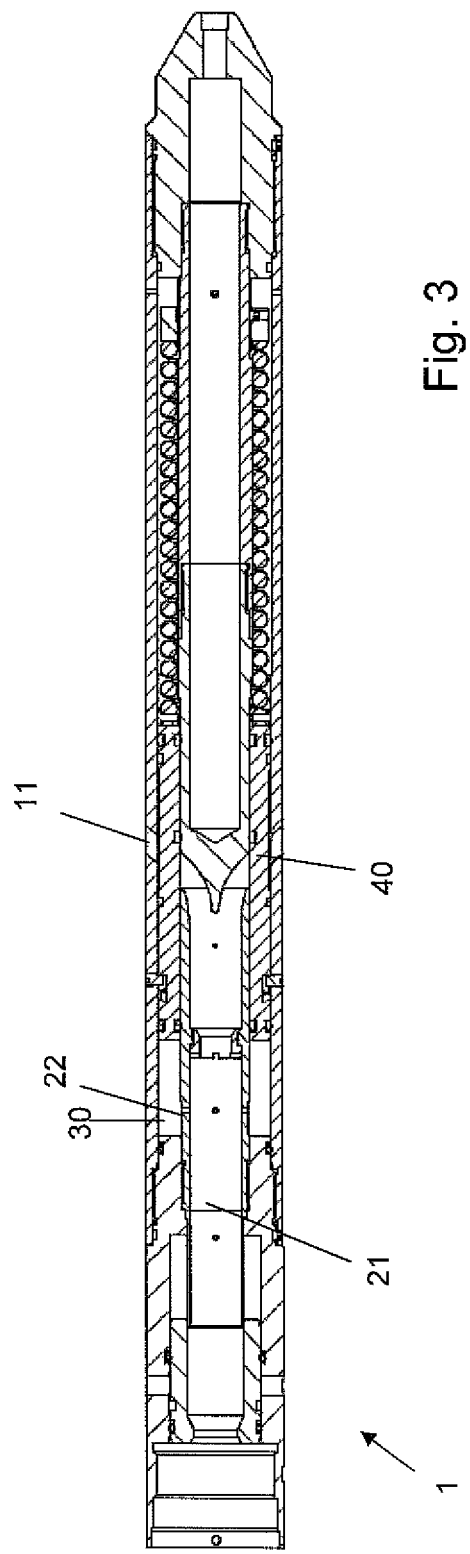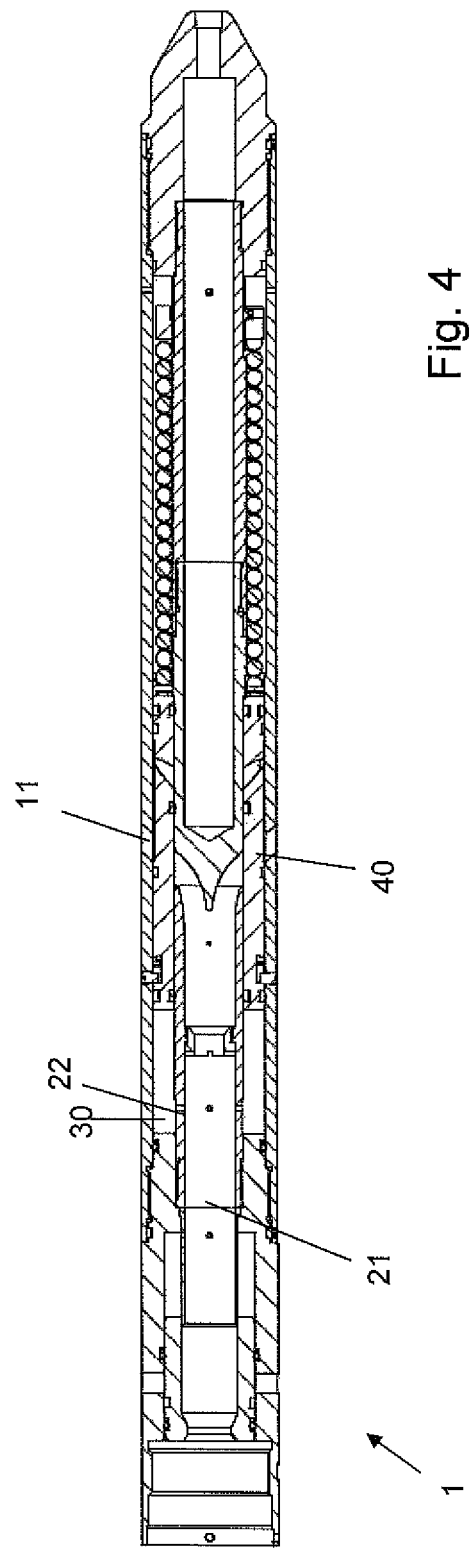

FLOW ACTIVATED CIRCULATING VALVE

CROSS REFERENCE TO RELATED APPLACATION

The present application is the U.S. national stage application of International Application PCT/EP2012/067275. filed Sep. 5, 2012, which international application was published on Mar. 14, 2013 as international Publication WO 2013/034577. The International Application claims priority of Norwegian Patent Application 20111202, filed Sep. 5, 2011, the contents of which are incorporated herein by reference in their entireties.

FIELD OF THE INVENTION

The present invention relates to a circulating valve. More specifically, the invention relates to a flow activated circulating valve.

BACKGROUND OF THE INVENTION

A circulating valve is generally used during different well operations in subterranean oil and/or gas wells. The circulating valve is lowered into the well bore by means of a tubular string. In its open state, circulating valves allow fluid to flow from the inside of the string to the well (or in the reverse direction). The circulating valve may be brought from its open state to a closed state wherein no fluid flow is allowed. The control of the circulating valve is performed from the topside, either by applying one predetermined pressure, applying several pressure pulses, or by increasing the fluid flow over fixed exit ports.

U.S. Pat. No. 4,403,659 describes a pressure controlled reversing valve comprising a housing with fluid ports being closed by means of a valve sleeve mounted on a spring-loaded mandrel. Two J-slot channel arrangements are used to control the opening/closing cycle of the valve. This reversing valve is closed in its initial state.

U.S. Pat. No. 6,104,345 describes a circulating valve which is responsive to the fluid flow rate through the valve. The valve comprises a housing and a mandrel provided inside the housing. The mandrel comprises a radial flow port, a biasing member, a ratchet with a J-slot channel arrangement, an inner sleeve and a one-way flow restrictor carried on the mandrel.

There are several disadvantages With the above valves. First of all, they are relatively complex, and they are also vulnerable to operation failure. The above valve use ports with relatively small diameter to achieve pressure differences. Hence, the valves are vulnerable to debris obstructing the ports. Moreover, these valves use only a small portion of the flow in order to control the operation of the valve, since most of the fluid is flowing through the through bore.

The object of the invention is to provide a reliable and relatively simple circulating valve. It is an object to provide a valve which is actuated by changing the fluid rate through the valve. Moreover, it is an object of the invention to be able to pressure test the inside of the string above the valve and the well below or outside the wall before re-opening the valve after a closure.

It is also an object of the invention to provide a valve which easily can be adapted to different wells, i.e. with respect to different well pressures, well fluids etc.

The circulating valve may replace ball subs, where it saves a significant amount of time waiting for activating halls to land. It also reduces risk in deviated wells where balls may have difficulties landing due to a combination of restrictions and gravitational effects. The circulating valve may also be used for flow control underneath bridge plus, packers, etc or for pressure testing of completion packers after installation.

Moreover, the circulating valve may be used in situations where a temporary barrier and circulation possibility are needed to avoid wireline intervention during completion or recompletion of the well.

SUMMARY OF THE INVENTION

The present invention relates to as circulating valve comprising:
  an outer housing comprising radial ports provided axially between an upper portion of the valve and a lower portion of the valve, where the upper portion comprises a tube connector and where the lower portion is closed;
  an inner sleeve provided inside the outer housing, where the inner sleeve is providing an axial bore through the upper portion of the valve to the radial ports;
  a cylinder compartment provided between the inner sleeve and the outer housing;
  a piston arranged for axial and rotational movement in the cylinder compartment, where the piston comprises piston ports arranged to provide fluid communication between the axial bore and the radial ports when the piston is in an open position, and where the piston is arranged to prevent fluid communication between the axial bore and the radial ports when the piston is in closed positions;
  an actuating device applying an axial pressure on the piston;
  a sleeve opening providing fluid communication between the axial bore and the cylinder compartment;
  a fluid orifice provided radially inside the inner sleeve; and
  a position controlling device for controlling the axial and rotational position of the piston in relation to the outer housing.

In one aspect, the circulating valve is a flow activated circulating valve.

In one aspect, the fluid orifice is provided axially between the sleeve opening and the radial ports.

In one aspect, the piston is axially and rotationally movable from the open position to a first closed position by increasing the fluid rate through the fluid orifice.

In one aspect, the piston is axially and rotationally movable from the first closed position to a second closed position by decreasing the fluid pressure in the axial bore.

In one aspect, the piston is axially and rotationally movable from the second closed position to a third closed position by increasing the fluid pressure in the axial bore.

In one aspect, the piston is axially movable from the third closed position to the open position by decreasing the fluid pressure in the axial bore.

In one aspect, the fluid orifice comprises a releasable connection device for connection to the inner sleeve.

In one aspect, the cross sectional area of each piston port is substantially corresponding to the cross sectional area of each radial port.

In one aspect, the position controlling device comprises a control slot and a control pin received in the control slot.

In one aspect, the control slot is provided circumferentially around the piston.

In one aspect, the control pin is fixed to the inner surface of the outer housing.

In one aspect, the circulating valve comprises:
a pressure equalizing opening provided in the upper portion as of the valve between the axial bore and the outside of the housing;
a pressure equalizing sleeve for initial closure of the pressure equalizing opening, where the pressure equalizing sleeve is fixed to the valve by means of shear pins.

DESCRIPTION OF THE FIGURES

Embodiments of the invention will now be described with reference to the enclosed drawings, where:

FIG. 3 illustrates a cross sectional view of the circulating valve in a second closed state;

FIG. 4 illustrates a cross sectional view of the circulating valve in a third closed state;

DETAILED DESCRIPTION

Figure 1:
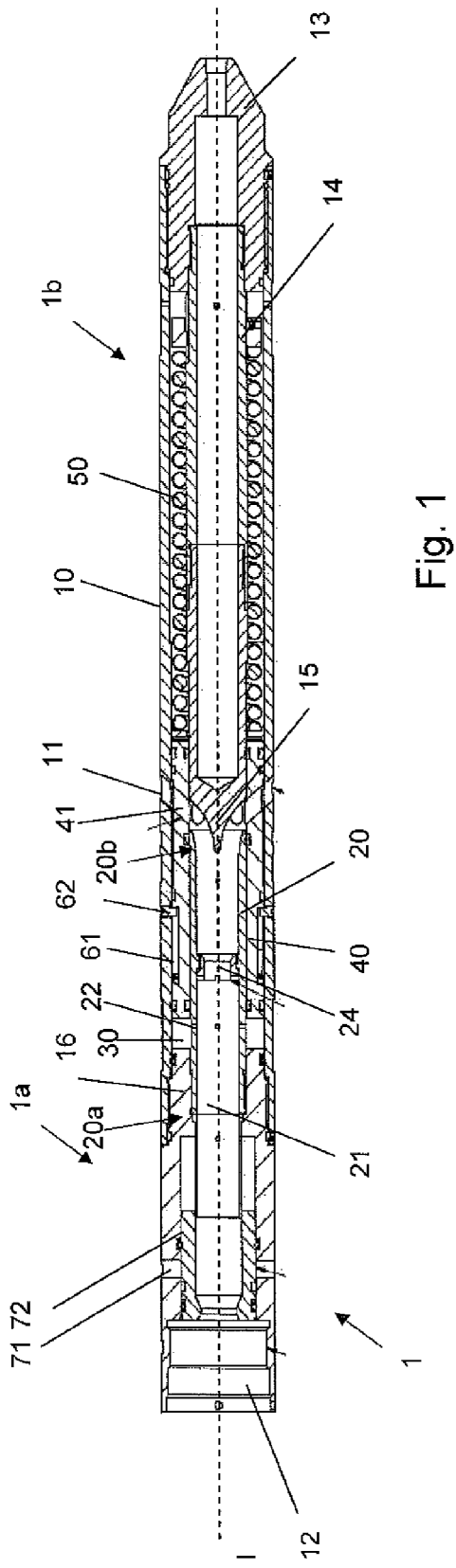
FIG. 1 illustrates a cross sectional view of the circulating valve in an open state.

It is now referred to FIG. 1, illustrating an embodiment of a circulating valve 1.

The circulating valve comprises an outer housing 10 comprising radial ports 11 provided axially between an upper portion 1a of the valve 1 and a lower portion 1b of the valve 1. Hence, the radial ports 11 define the border between the upper and the lower portion. The outer housing 10 is substantially cylindrical with a longitudinal axis I illustrated by a dashed line in FIG. 1.

In the present embodiment the outer diameter of the housing 10 is 83 mm (3.25") and is designed for use in well pipes with inner diameter larger than ca 101 mm (4").

The upper portion 1a of the valve 1 comprises a tube connector 12 for connection to a pipe string. In the present embodiment the tube connector 12 is provided as a threaded area in the upper end of the housing 10. The pipe string may comprise one or several other tools, such as a production packer, a liner/screen hanger, a second packer, for example a medium expansion plug etc. The pipe string together with the circulating valve and tools are lowered down into the well from the topside. Hence, the term "upper" is here used to describe the portion of the valve being faced towards the surface of the well, while the term "lower" is used to describe the portion of the valve being faced towards the bottom of the well. It should be noted that the well may be a vertical well, a tapering well or a horizontal well.

Fluid may be pumped from the topside through the pipe string and into the circulating valve 1 and further out through the radial ports 11 when the circulating valve 1 is in its open state. It should be noted that in the open state, fluid may also flow in the reverse direction, i.e. from the well, in through the radial ports 11 and further up inside the pipe string.

The lower portion 1b of the valve 1 is closed. Hence, no fluid may exit from the valve 1 below the radial ports 11.

Consequently, the circulating valve 1 is considered not to have a through bore. In FIG. 1 it is shown that the lower portion 1b comprises a closure in the form of an end section 13 being used to the lower end of the outer housing 10. Moreover, an inner housing 14 is fixed to the end section 13. In FIG. 1 it is shown that the inner housing 14 comprises a pointed end 15 located close to the radial ports 11 and being faced towards the tube connector 12. The pointed end 15 directs the fluid flow from the pipe string out through the radial ports 11 when the circulating valve 1 is in its open state.

The circulating valve 1 further comprises an inner sleeve 20 provided inside the outer housing 10. In FIG. 1 it is shown that the inner sleeve 20 is cylindrical and is provided radially inside the upper portion 1a of the valve 1. The inner sleeve 20 is providing an axial bore 21 through the upper portion In to the radial ports 11.

The inner sleeve 20 has a first end 20a which may be located at or near the entrance of the valve 1, i.e. at or near the tube connector 12, or it may be located with a distance to the tube connector 12. The second end 20b of the inner sleeve 20 is located at or near the exit of the valve 1, i.e. at or near the radial ports 11. The axial bore 21 provides a fluid communicating channel through the valve 1.

It should be noted that the valve 1 may comprise a pressure equalizer 70 which will be described in detail below. The pressure equalizer 70 may form a continuation of the axial bore 21 from the tube connector 12 to the first end of the inner sleeve 20.

The circulating valve 1 further comprises a cylinder compartment 30 provided between the inner sleeve 20 and the outer housing 10. The cylinder compartment 30 is provided as an annulus between the outer surface of the inner sleeve 20 and the inner surface of the outer housing 10. This is achieved by connecting the inner sleeve 20 to the outer housing 10 to each other by means of a connection member 16.

A sleeve opening 72 is providing fluid communication between the axial bore 21 and the cylinder compartment 30. The sleeve opening 22 is in the present embodiment provided as eight openings between the axial bore 21 and the cylinder compartment 30.

Figure 5:
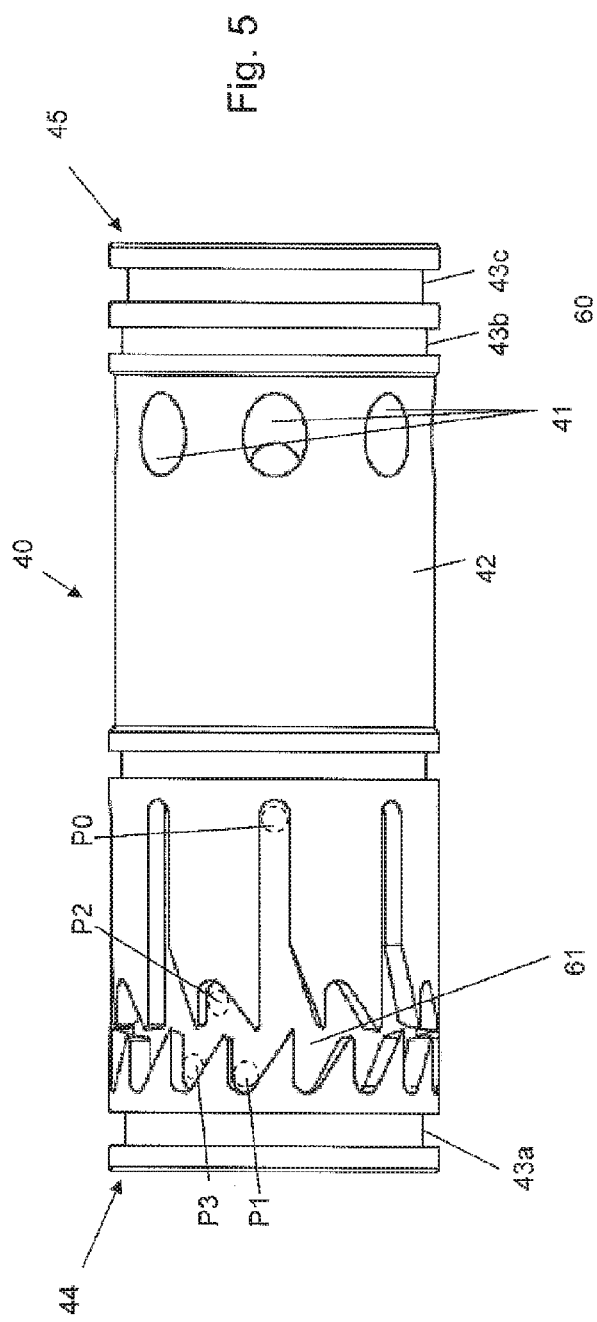
FIG. 5 illustrates a side view of the piston of the circulating valve in FIG. 1-4.

The valve 1 further comprises a piston 40 arranged for axial and rotational movement in the cylinder compartment 30. The piston 40 is shown in FIG. 5 and is substantially cylindrical. The piston comprises piston ports 41. The piston ports 41 are provided in a substantially cylindrical outer surface 42 of the piston 40.

The piston 40 is sealingly arranged in the cylinder compartment 30, i.e. no fluid should be allowed to enter between the outer surface of the piston 40 and the inner surface of the outer housing or between the inner surface of the piston 40 and the outer surface of the inner sleeve 20. The piston 40 may comprise grooves 43a, 43b, 43c wherein o-rings are provided in order to seal against the outer housing 10. Corresponding grooves and o-rings may be provided on the inner surface of the piston 40 as well.

The piston ports are 41 arranged to provide fluid communication between the axial bore 21 and the radial ports 11 when the piston 40 is in an open position. The piston 40 is arranged to prevent fluid communication between the axial bore 21 and the radial ports 11 when the piston 40 is in a closed position.

Moreover, the piston 40 comprises a first piston surface 44 provided in the first or upper end of the piston 40 and a second piston surface 45 in the second or lower end Of the piston 40. The cylinder compartment 30 is limited by the first piston surface 44, the inner surface of the outer housing 10, the outer surface of the inner sleeve 20 and the surface of the connection member 16. It should be noted that the inner surface of the connection member 16 forms apart of the axial bore 24 together with the inner surface of the inner sleeve 20.

The valve 1 further comprises an actuating device 50 applying an axial pressure on the piston 40. In the present invention the actuating means 50 is a spring provided in the lower portion 1b of the valve 1, more specifically axially between the second piston surface 45 and the end section 13 and radially between the outer housing 10 and the inner housing 14. The actuating device 50 presses the piston 40 up towards the piston compartment 30.

A fluid orifice 24 is provided radially inside the inner sleeve 20. In the present embodiment the fluid orifice 24 is provided axially between the sleeve opening 22 and the radial ports 11. The fluid orifice 24 has an inner diameter which is less than the inner diameter of the inner sleeve 20. In the present embodiment, the fluid orifice 24 is replaceable with other fluid orifices having other inner diameters. A suitable fluid orifice 24 will be selected based on fluid and rate requirement for the well.

In an alternative embodiment, the fluid orifice 24 may be provided axially on the upper side of the sleeve opening 22, however, in such an embodiment, the function of the valve will be different. This will be described in detail below.

The valve 1 further comprises a position controlling device 60 for controlling the axial and rotational position of the piston 40 in relation to the outer housing 10. Hence, the position controlling device 60 controls the sequence of the piston movements between the open state and the closed states of the valve 1.

In the present embodiment, the position controlling device 60 comprises a control slot 61 (shown in FIG. 1, FIG. 5 and FIG. 6) and a control pin 62 (shown in FIG. 1) received in the control slot 61. The control slot 61 is provided circumferentially around the piston 40 and the control pin 62 is fixed to the inner surface of the outer housing 10. It should be noted that the control slot 61 could be provided on circumferentially on the radial inner surface of the piston and the control pin could be provided on the radial outer surface of the inner sleeve 20. It could also be possible to provide the control slot 61 on the radial outer surface of the inner sleeve 20 and the control pin 62 could be provided on the radial inner surface of the piston. Several other position controlling devices 60 could also be possible.

In the embodiment described above, the cross sectional area of each piston port 41, i.e. the area of which the fluid is flowing through the piston 40, is substantially corresponding to the cross sectional area of each radial port 11. In the present embodiment, the diameter of the radial port 11 and the diameter of the piston port 41 is 13 mm, and there are eight piston ports 41 in the piston 40 and there are eight radial ports 11 in the housing 10, arranged to be positioned in relation to each other in the open state. It should be noted that the diameter of the piston port 41 and the radial port 11 may be for example be between 10-20 mm. Moreover, the cross sectional total area of the piston ports 41 may be larger than the cross sectional area of the axial bore 21. The cross sectional total area of the radiap ports 11 may be larger than the cross sectional area of the axial bore 21. With such relatively large ports 11, 41, the risk of debris obstructing these ports is considerably reduced.

The operation of the circulating valve will now be described.

In a first step, the circulation valve 1 together with the pipe string and other tools are lowered into the correct position in the well. This operation is considered known for a skilled person and will not be described here in detail.

On the topside, there is a pumping device for pumping fluid into the pipe string and further into the circulating valve 1. In addition, there is a flow meter for Measuring the flow rate from the pump and a pressure meter for measuring the pressure of the fluid in the pipe string.

Figure 6:
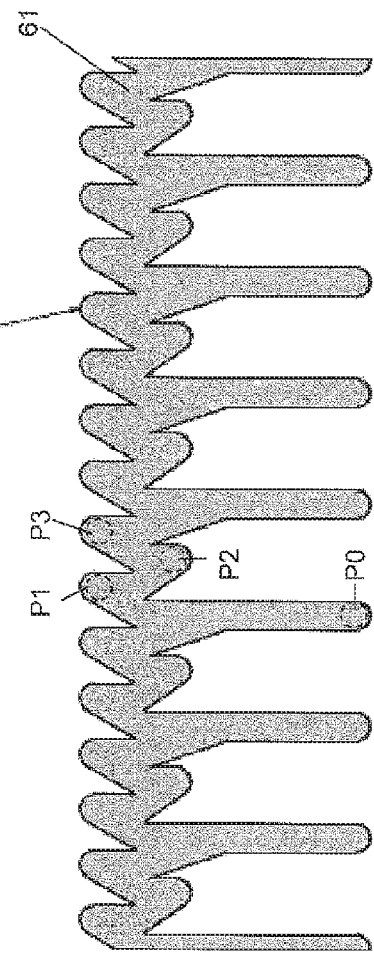
FIG. 6 illustrates a plan view of the unwrapped profile of the control slot of the piston in FIG. 5.

Initially, the piston 40 is in its open state, wherein the control pin 62 (indicated by a dashed circle) is in the position P0 in FIGS. 5 and 6. The piston ports 41 are here oriented such that fluid may flow from the topside, through the pipe string, further through the axial bore 21 and out through the piston ports 41 and the radial ports 11 and out into the well.

At a low fluid rate, the fluid is flowing freely through the circulation valve and pressure of the fluid is low. When the fluid rate through the fluid orifice 24 is increasing, the fluid pressure on the upper site of the fluid orifice 24 will gradually increase. The pressure will also be increased in the cylinder compartment 30 since fluid are flowing into the cylinder compartment 30 through the sleeve openings 22. Hence, the piston 40 is axially and rotationally movable from the open position P0 to a first closed position P1 by increasing the fluid rate through the fluid orifice 24. When the fluid rate has reached a certain level, the pressure on the cylinder compartment 30 is exceeding the pressure applied to the piston 40 by the actuating device 50, and the piston 40 will be pressed downwards.

The position controlling device controls the axial and rotational position of the piston 40 in relation to the outer housing 10 as the piston is pressed down.

Figure 2:
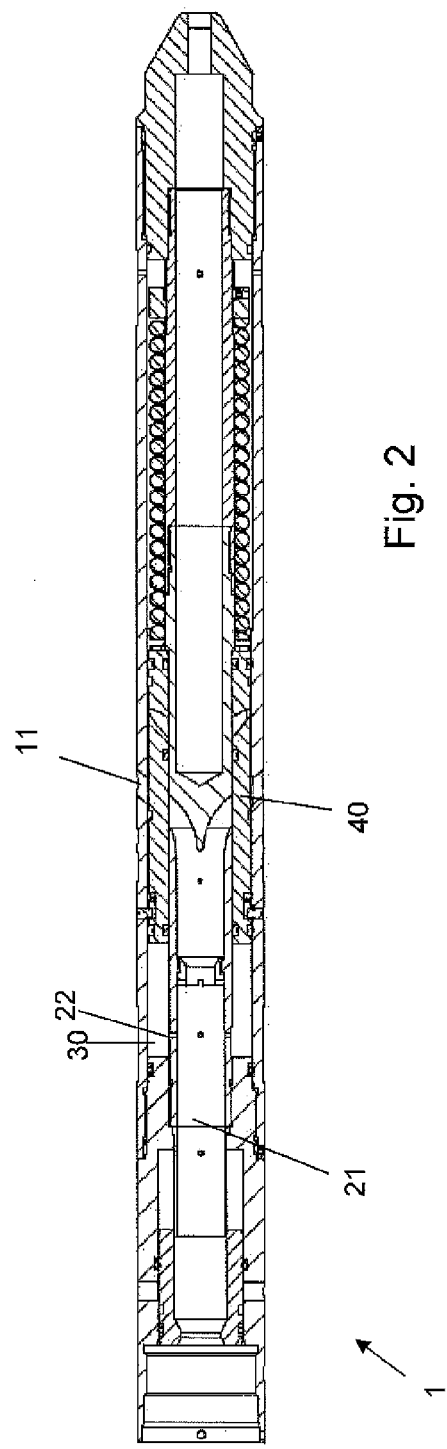
FIG. 2 illustrates a cross sectional view of the circulating valve in a first closed state.

The piston 40 stops when the control pin 62 reaches an end of the control slot 61. This end position is denoted as the first closed position P1. In this position, the substantially cylindrical outer surface 42 of the piston 40 will close the radial ports 11. In FIG. 2 the piston 40 is in the first closed position P1.

The pumping device topside may now be used to increase the pressure in the pipe string and hence in the axial bore 21 further, in order to pressure test the pipe string.

The pumping device topside may now be used to decrease the fluid pressure in the pipe string and hence in the axial bore 21. The piston 40 will then be axially and rotationally moved from the first closed position P1 to a second closed position P2. In FIG. 3 the piston 40 is in this second closed position P2.

The pressure outside the pipe string and hence outside the axial bore 21, i.e. the pressure in the well, may now be increased in relation to the inside pressure of axial bore 21 (in order to perform a pressure test of the well.

The pumping device topside may now be used to increase the fluid pressure in the pipe string and hence in the axial bore 21. The piston 40 will then be axially and rotationally moved from the second closed position P2 to a third closed position P3. In FIG. 4 the piston 40 is in this third closed position P3.

Again, the pumping device topside may now be used to increase the pressure in the pipe string and hence in the axial bore 21 further, in order to pressure test the pipe string.

The pumping device topside may now be used to decrease the fluid pressure in the pipe string and hence in the axial bore 21. The piston 40 will then be axially and rotationally moved from the third closed position P3 to the open position P0. In FIG. 1 the piston 40 is in the open position P0.

The fluid orifice 24 may comprise a releasable connection device (not shown) for connection to the inner sleeve 20. Hence, the fluid orifice 24 may be replaced by a fluid orifice 24 having a larger or smaller diameter in order to adjust the fluid rate needed to move the piston 40 from the open position P0 to the first closed position P1. By utilizing a purpose-built replacement tool, for example comprising a threaded connection device or a purpose-built tool, the fluid orifice 24 may be replaced without disassembling the entire circulating valve.

The circulating valve 1 may also comprise a pressure equalizer 70 comprising a pressure equalizing opening 71 in the upper portion 1a of the valve between the axial bore 21 and the outside of the housing 10. In FIG. 1 it is shown that the pressure equalizing opening 71 is provided in the axial bore 21 being formed by the connection member 16. The pressure equalizer 70 also comprises a pressure equalizing sleeve 72 for initial closure of the pressure equalizing opening 71. The pressure equalizing sleeve 72 is fixed to the valve 1, for example to the housing 10 or to the connection member 16 by means of shear pins 73. The sleeve 72 may also form parts of the axial bore 21 through the upper portion of the valve.

Figure 7:
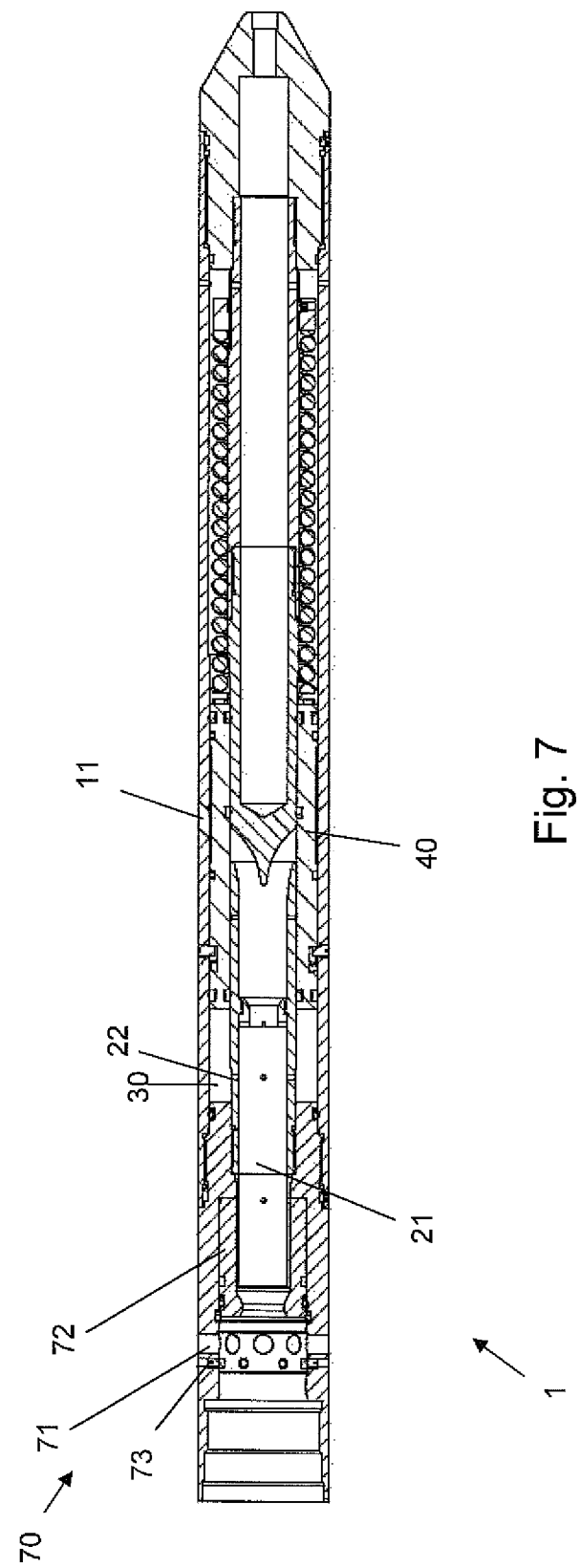
FIG. 7 illustrates a cross sectional view of the circulating valve where the pressure equalizing sleeve has been actuated.

If the piston 40 is stuck in one of its closed positions, the stroke may be applied to the sleeve 72 in order to break the shear pins and press the sleeve 72 downwards to the position shown in FIG. 7. The sleeve 72 will no longer close the pressure equalizing opening 71 and the pressure on the inside of the axial bore 21 and the outside of the housing may be equalized.

Figure 8:
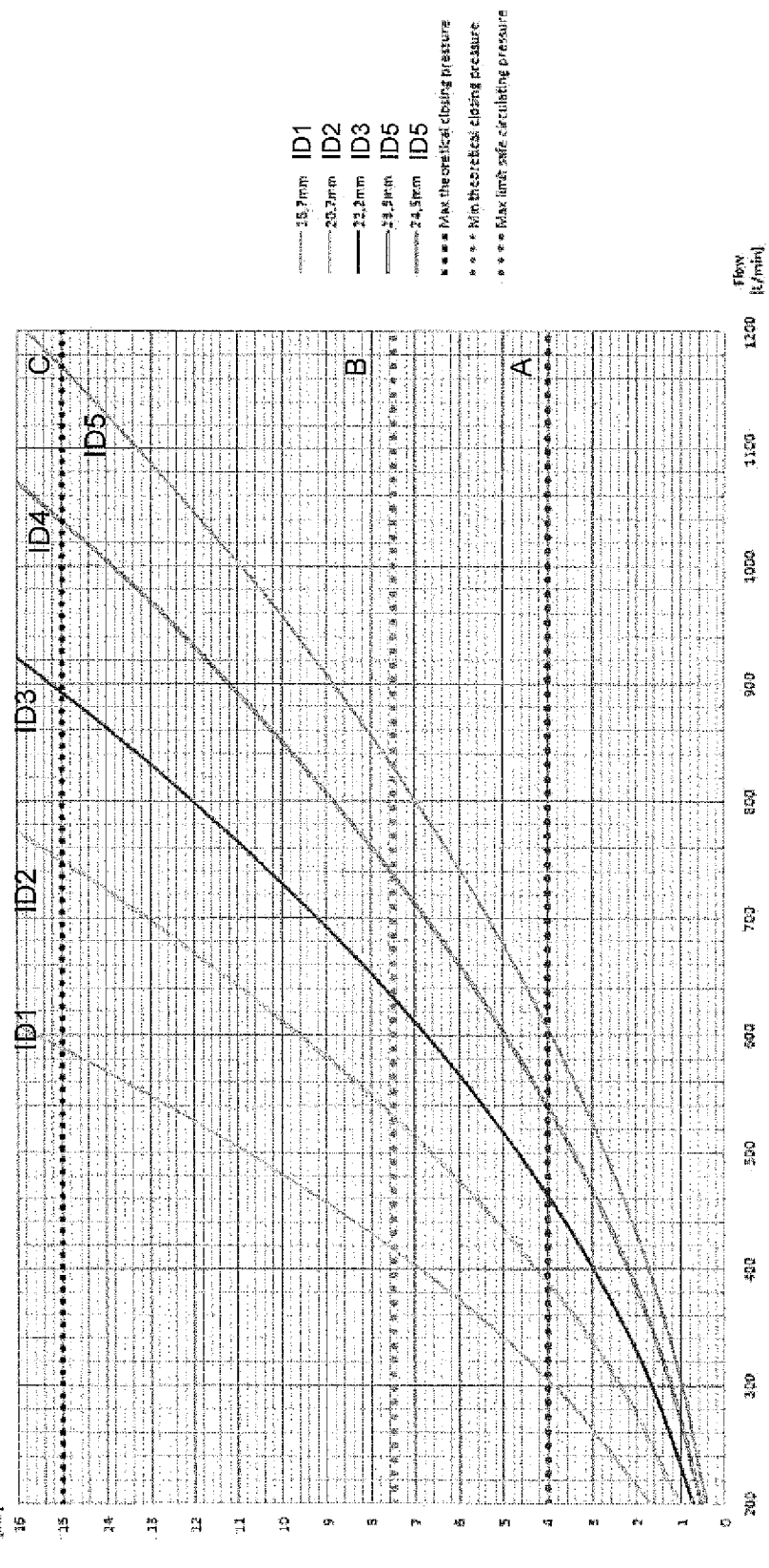
FIG. 8 illustrates a theoretical differential pressure chart for different sizes of the fluid orifice of one embodiment of the fluid activated circulating valve (FACV) circulating with water.

In FIG. 8 it is shown curves of the differential pressure over the fluid orifice as a function of the fluid flow rate through the fluid orifice for different fluid orifices. A threshold for the maximum circulating pressure A is indicated as a first horizontal line, a threshold for the minimum theoretical closing pressure B is indicated by a second horizontal line and the a threshold for the maximum theoretical closing pressure C is indicated by a third horizontal line.

Alternative Embodiments

In an alternative embodiment, the fluid orifice 24 may be located above the sleeve openings 22. In such an embodiment, the piston 40 may only close when the fluid flow rate in the reverse direction reaches a certain level.

The invention claimed is:

1. Circulating valve comprising:
   an outer housing comprising radial ports provided axially between an upper portion of the valve and a lower portion of the valve, where the upper portion comprises a tube connector and where the lower portion is closed;
   an inner sleeve provided inside the outer housing, where the inner sleeve is providing an axial bore through the upper portion of the valve to the radial ports;
   a cylinder compartment provided between the inner sleeve and the outer housing;
   a piston arranged for axial and rotational movement in the cylinder compartment, where the piston comprises piston ports arranged to provide fluid communication between the axial bore and the radial ports when the piston is in an open position, and where the piston is arranged to prevent fluid communication between the axial bore and the radial ports when the piston is in closed positions;
   an actuating device applying an axial pressure on the piston;
   a sleeve opening providing fluid communication between the axial bore and the cylinder compartment;
   a fluid orifice provided radially inside the inner sleeve; and
   a position controlling device for controlling the axial and rotational position of the piston in relation to the outer housing.

2. The circulating valve according to claim 1, where the fluid orifice is provided axially between the sleeve opening and the radial ports.

3. The circulating value according to claim 1, where the piston is axially and rotationally movable from the open position to a first closed position by increasing the fluid rate through the fluid orifice.

4. The circulating valve according to claim 3, where the piston is axially and rotationally movable from the first closed position to a second closed position by decreasing the fluid pressure in the axial bore.

5. The circulating valve according to claim 4, where the piston is axially and rotationally movable from the second closed position to a third closed position by increasing the fluid pressure in the axial bore.

6. The circulating valve according to claim 5, where the piston is axially movable from the third closed position to the open position by decreasing the fluid pressure in the axial bore.

7. The circulating valve according to claim 1, where the fluid orifice comprises a releasable connection device for connection to the inner sleeve.

8. The circulating valve according to claim 1, where the cross sectional area of each piston port is substantially corresponding to the cross sectional area of each radial port.

9. The circulating valve according to claim 1, where the position controlling device comprises a control slot and a control pin received in the control slot.

10. The circulating valve according to claim 9, where the control slot is provided circumferentially around the piston.

11. The circulating value according to claim 10, where the control pin is fixed to the inner surface of the outer housing.

12. The circulating value according to claim 1, where the circulating valve comprises:
    a pressure equalizing opening provided in the upper portion 1a of the valve between the axial bore and the outside of the housing;
    a pressure equalizing sleeve for initial closure of pressure equalizing opening, where the pressure equalizing sleeve is fixed to the valve by means of shear pins.

* * * * *